DATA TRANSMISSION VERIFIER

Filed May 29, 1961 3 Sheets-Sheet 1

INVENTORS
CHARLES J. BARBAGALLO
RICHARD D. PASCIUTO
BY Fred Jacob
ATTORNEY

DATA TRANSMISSION VERIFIER

INVENTORS
CHARLES J. BARBAGALLO
BY RICHARD D. PASCIUTO

Fred Jacob
ATTORNEY

March 15, 1966 C. J. BARBAGALLO ETAL 3,240,920

DATA TRANSMISSION VERIFIER

Filed May 29, 1961 3 Sheets-Sheet 3

INVENTORS
CHARLES J. BARBAGALLO
RICHARD D. PASCIUTO

BY

Fred Jacob
ATTORNEY

United States Patent Office 3,240,920
Patented Mar. 15, 1966

3,240,920
DATA TRANSMISSION VERIFIER

Charles J. Barbagallo, Needham, and Richard D. Pasciuto, Randolph, Mass., assignors to Honeywell Inc., a corporation of Delaware Filed May 29, 1961, Ser. No. 113,351
20 Claims. (Cl. 235—153)

Figure 1:
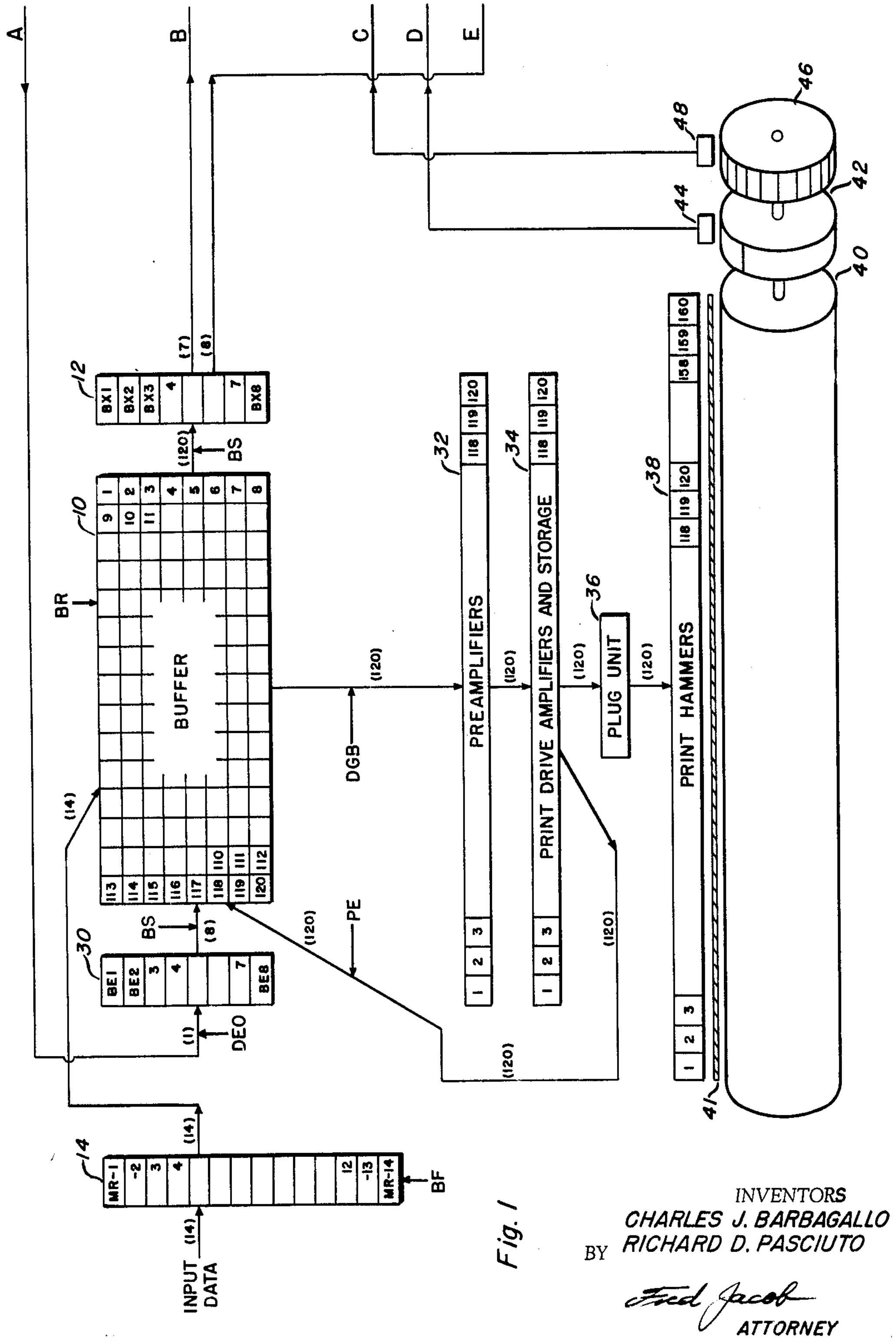

The present invention relates in general to new and improved control apparatus, in particular, to apparatus responsive to the receipt of digitally encoded input information for carrying out the transfer of corresponding data characters to a storage medium while verifying that a proper transfer has taken place.

Present-day digital computers require data output equipment which is capable of operating at very high speeds. The function of such equipment is generally to transfer the output data, which is normally received in encoded form, from the computer to a more or less permanent storage medium. This data transfer may take the form of printing the data characters on a paper web, card punching, magnetic recording, or any other of numerous ways of storing data which will readily suggest themselves to those skilled in the art. Since these data transfer operations must occur at very high speeds, the possibility of errors which may occur not only due to the failure of the mechanical equipment itself but also due to faults in the circuitry, is vastly increased. When it is considered that the presence or absence of a single binary digit can make the difference between a true and a false result, the need for checking equipment to verify the correctness of the data at every step between the computer and the storage medium will become readily apparent.

Various kinds of parity checking schemes are well known at this state of the computer art. Parity checks normally rely on a summation of the various digital codes with a parity check bit which is carried in the data stream and a comparison of the aforesaid summation with a predetermined code. Although a very high probability of detecting existing errors in a given data code is inherent in most parity checking schemes, such a check has only limited utility when output equipment of the type mentioned above is involved. This is due to the fact that in the process of selectively storing data characters in an output storage medium, the data codes must ultimately be translated into energizing signals for the equipment which carries out the actual transfer of the data characters to the medium. For example, if a hammer printing operation is considered, hammer energizing signals must be produced which are not readily susceptible of parity checking in the same way as their originating data codes. Unless some checking scheme is provided, a serious gap will exist in the verification of the sequence of operations which occurs between the time the data appears at the output of the computer and the time it is printed. Substantial errors could thus go undetected until found by the ultimate user of the printed product.

It is the primary object of the present invention to provide apparatus responsive to encoded input data which is capable of controlling the transfer of data characters to an output data storage medium under completely verified conditions.

Inasmuch as present-day output equipment generally operates at far lower speeds than the computer which it serves, it is particularly important for all checking operations to be carried out concurrently with the actual printing wherever possible so as not to occasion any additional delays. While speed in performing the individual checking operations required for each data character is in itself important, these operations must in addition be efficiently interlaced or, if possible, be carried out concurrently with each other. Much of the checking equipment which is presently in use falls short of such performance and contributes materially to reducing the maximum performance rate of the system with which it operates.

Accordingly, it is another object of this invention to provide apparatus responsive to the receipt of encoded input data for controlling and verifying the proper transfer of corresponding data characters to an output data storage medium, which occasions substantially no increase of the total time required for transferring the data to the storage medium.

It is nearly always desirable to hold the amount and the complexity of computer equipment to a minimum. Any expansion of the equipment not only adds to its total cost but, perhaps more importantly, it increases the total service and maintenance time required during which the equipment is inoperative. This increase occurs more often than not in geometric progression with any equipment expansion, due to the interdependence of the various parts of the system. Frequently, the computer itself must remain inoperative pending the proper adjustment of the output equipment. Considering the cost of the equipment involved, it will be apparent that so-called computer "down" time is a matter of prime economic concern which makes is imperative to keep the equipment as simple as possible.

The size and complexity of prior art computer systems is increased materially by the checking equipment generally found in use therewith. In an attempt to avoid any reduction in the speed of transferring output data, prior art computers frequently rely on equipment which works in parallel with the rest of the system and which is relatively independent of the latter. In addition to adding to the size of the existing system, such a technique is inefficient since the additional equipment is in use for only a short period during each cycle. Thus, the required maintenance and service time as well as the total cost of the system is increased.

Accordingly, it is a further object of this invention to provide apparatus responsive to encoded input data for controlling and verifying the proper storage of corresponding data characters in an output data storage medium, which apparatus is simple in construction and is efficiently utilized.

In brief, the present invention comprises a data storage facility such as a core matrix to which the incoming data in digitally encoded form is transferred by way of a buffer. The data itself is composed of a predetermined number of different digital codes, e.g., a separate code for each data character such as each letter, each numeral and each punctuation and spacing mark. A pattern generator which is synchronized to the operation of the data transfer device that effects the actual storage of data characters in the output data storage medium provides the aforementioned digital codes for the different data characters in recurring succession at its output. Comparator means compare the code appearing at the output of the pattern generator with the data stored in each location of the core matrix. If a true comparison is determined to exist for a given character under consideration, an indication thereof is stored in the aforementioned buffer in a location corresponding to the location of the core matrix then compared, as well as in a correspoding location of a special section of the core matrix.

Subsequently, while the foregoing process repeats for subsequent data characters, the true comparison indications previously stored in the buffer are used to energize the tranfer means which effect the actual storage of the data character in the storage medium. Echo pulses are derived in response to such energization and are transferred by way of the buffer to an echo checking unit. Still later, the echo check unit checks the aforementioned echo signals against the true comparison indications stored in the special matrix storage section relative to the first character compared. If a negative check occurs indicative of an error, it may be used to actuate an alarm and/or to disable the apparatus.

Figure 2:
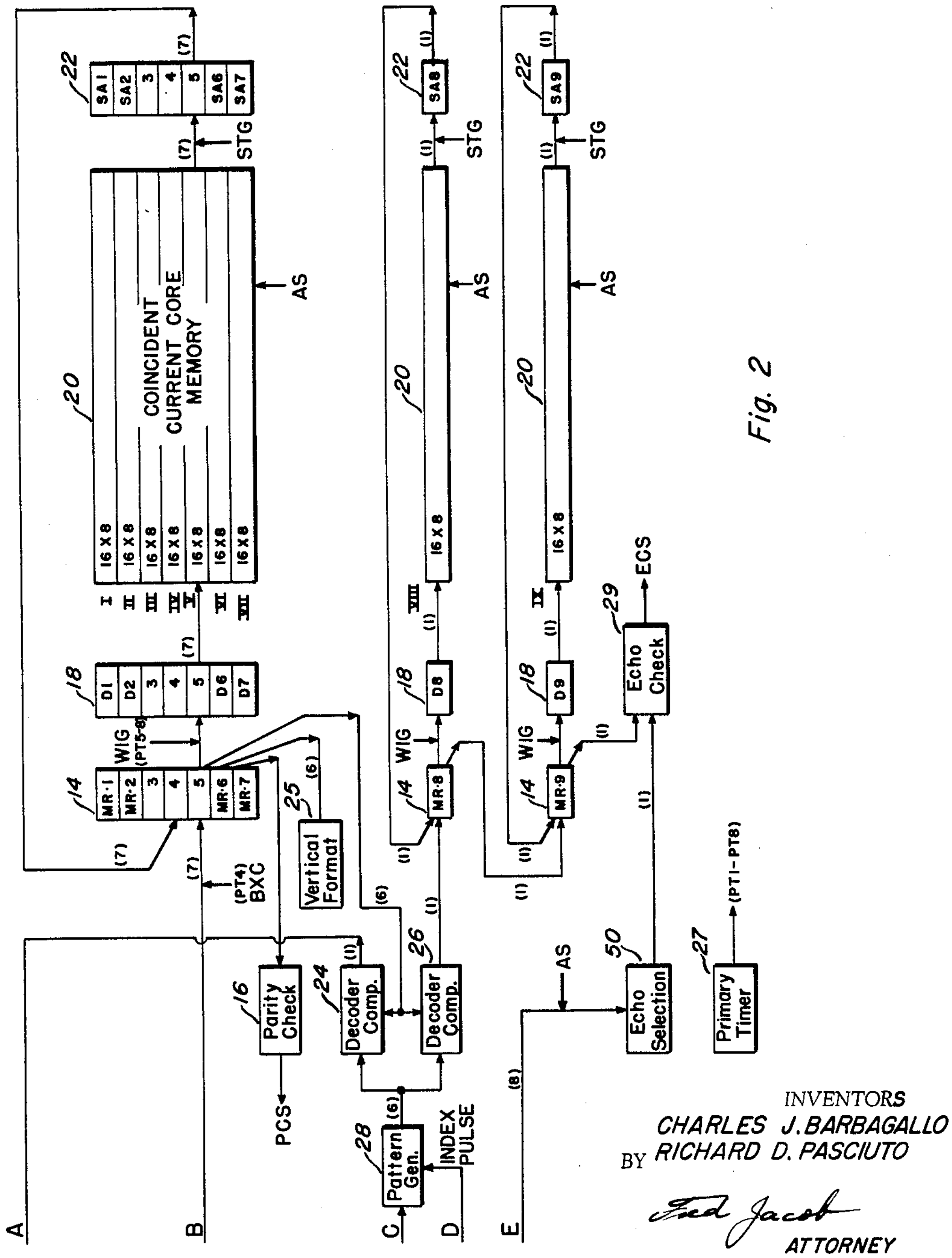
Figure 3:
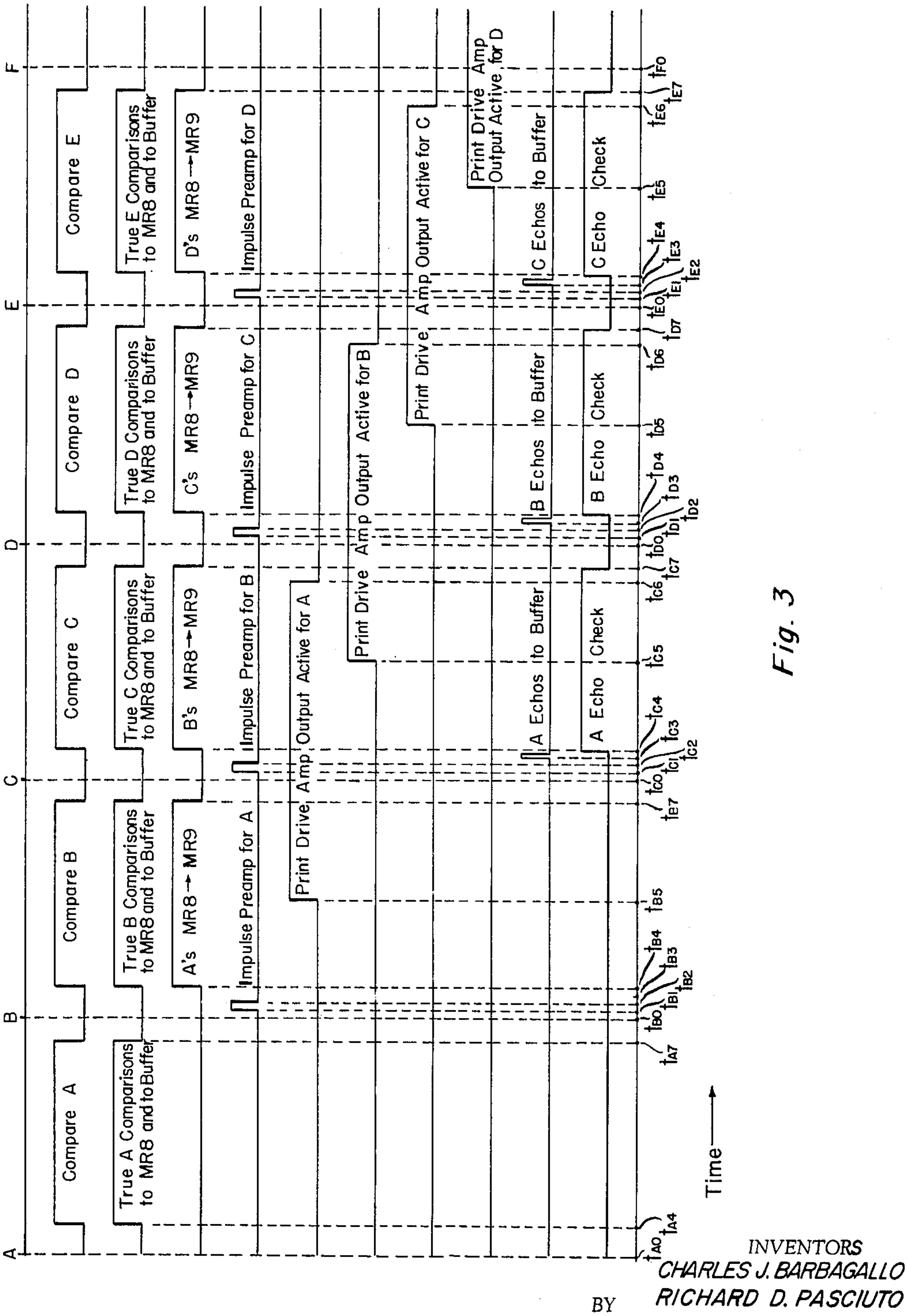

The various novel features which characterize the invention are pointed out with particularity in the claims annexed to and forming a part of this specification. For a better understanding of the invention, its advantages and specific objects thereof, reference should be had to the following detailed description and the accompanying drawings in which:

FIGURES 1 and 2 illustrate a preferred embodiment of the invention as applied to a "line-at-a-time" printer; and FIGURE 3 is a timing diagram for certain key operations which take place in the apparatus of FIGURES 1 and 2.

FIGURES 1 and 2 illustrate a preferred embodiment of the invention for printing successive lines of information under the control of incoming data from a computer. The connecting lines which couple parts of the apparatus in FIGURES 1 and 2 have been designated A, B . . . E in both drawings so as to indicate their correspondence. Without limiting the invention thereto, the data organization adopted in a preferred embodiment calls for 120 printed characters per line. This data, prior to printing, is organized into 16 words, i.e. 15 information words and one control word which contains information pertinent to the vertical format of the printed line. Each word consists of eight characters, each character being represented by a six-bit code and each word having six parity check bits associated therewith. A word is thus represented by 54 bits.

The input data from the computer is coupled to a memory register 14 to be resynchronized in accordance with the timing requirements of the apparatus herein, as determined in part by a primary timer 27. The latter unit may be of the kind disclosed in a copending application of Henry W. Schrimpf, entitled "Electrical Data Processing Apparatus," filed January 25, 1957, Serial Number 636,256, now Patent No. 3,201,762, which is assigned to the assignee of the present application. The input data arrives at the memory register unit on 14 input lines, as indicated by the designation (14) above the schematic single-line representation of the input in the drawing. For the purpose of this discussion, the unit 14 may be considered as comprising 14 registers MR–1 to MR–14, each essentially consisting of an "and-or" gate whose output is coupled to a flip-flop circuit. The assertive output of the latter is coupled back to the input of the "and-or" gate. A circuit of this kind is disclosed in the aforesaid copending application Serial Number 636,256. The 14-line output of the unit 14 is coupled to 54 gate buffer amplifiers of a buffer 10. The latter consists of 120 substantially identical units each comprising a gate buffer amplifier. A circuit of this kind is disclosed in a copending application of Charles J. Barbagallo, entitled "Electrical Apparatus," filed November 30, 1961, Serial Number 156,017, which is assigned to the assignee of the present application. For this purpose of this discussion it will suffice to state that each gate buffer amplifier performs a logical "and-or" function, as well as amplification, and that it is capable of receiving a single binary digit and storing it by recirculation. In accordance with the organization of the data chosen in the preferred embodiment of the invention, the constituent units of the buffer are organized into 15 columns of eight units each.

One hundred and twenty output lines, as indicated schematically by a single line having the designation (120), connect the buffer to a buffer exit unit 12. The latter consists of eight identical gate buffer amplifiers BX1–BX8 similar in structure to those of the buffer, each buffer exit having 15 input lines. Each buffer exit is connected to a gate buffer amplifier of a separate buffer column but in the same row. The eight output lines of the buffer exit unit 12 are connected to an echo selection unit 50 which may constitute a simple commutating circuit of the kind which includes a counter to select one of eight incoming signals in sequence. The output of the unit 50 is coupled to an echo check unit 29, which may consist of an "exclusive or" circuit of the kind disclosed in Patent Number 2,977,047 to Richard M. Bloch, issued March 28, 1961, which is assigned to the assignee of the present application. The buffer exit unit is further connected to the input of the aforementioned memory register unit 14, which is time-shared and which is illustrated twice in the drawing for the sake of completeness of the data flow diagram. In this case, only nine registers MR1–MR9 are employed, seven of which (MR1–MR7) are connected to the buffer exit unit.

The outputs of the seven memory registers MR1–MR7 are connected to a parity check unit 16. A circuit illustrative of parity checking is disclosed in Reissue Patent Number 24,447 to Richard M. Bloch, issued March 25, 1958, which is assigned to the assignee of the present application. The outputs of MR1–MR6 are connected to the input of a vertical format unit 25, which may be of the kind disclosed in a copending application of Charles J. Barbagallo et al., entitled "Electrical Apparatus," filed November 28, 1961, Serial Number 155,344, which is assigned to the assignee of the present application. The output of the memory register unit 14 is further coupled to a write inhibit driver unit 18 which includes nine substantially identical inhibit driver amplifiers D1–D9, each adapted to provide an inhibit drive pulse at its output. A circuit for carrying out this function is disclosed in the aforesaid copending application Serial Number 636,256. The outputs of the write inhibit drivers D1–D9 are connected to a coincident core memory 20 by means of nine lines. For the purpose of the present discussion, the core memory may be considered as having nine separate memory planes I–IX, each comprising a core matrix of 16 columns and eight rows. A memory location in the core memory may be defined as including corresponding cores in all of the core planes, although it will be clear from the discussion which follows that such a location generally refers to less than all nine planes. The output of the coincident current core memory is connected to a sense amplifier unit 22 comprising individual amplifiers SA1–SA9, which may be of the kind illustrated in the aforesaid copending application Serial Number 636,256. The output of the unit 22 is fed back to the input of the unit 14 so that each sense amplifier is connected to the input of its corresponding memory register.

Six output lines couple the registers MR1–MR6 to a pair of decoder comparators 24 and 26 respectively, each of which receives a second input on six lines, from a pattern generator 28. Each decoder comparator basically consists of an "and-or" gate, the inputs being so chosen that a comparison is effected between the code patterns simultaneously applied thereto. The pattern generator may take the form of a counter which provides a succession of output codes as it is advanced by successively applied input pulses. A pattern generating circuit is disclosed in a copending application of Alan J. Deerfield, entitled "Electrical Apparatus," filed August 4, 1958, Serial Number 752,857, which is assigned to the assignee of the present application. The output of the decoder comparator 26 is coupled to the memory register MR8 whose output, in addition to being connected to the inhibit driver D8 corresponding to the plane VIII of the core memory, is further connected to the input of the memory register MR9. The output of MR9 is coupled to the inhibit driver D9, as well as to the input of the aforementioned echo check unit 29. The output of the decoder comparator 24 is coupled to a buffer entry unit 30 by means of a single line. The buffer entry unit 30 comprises eight identical buffer entry circuits BE1–BE8 each of which provides a buffering and amplification function. A circuit of this kind is disclosed in the aforesaid copending application Serial Number 156,017.

One hundred and twenty lines serve to connect the buffer to a pre-amplifier unit 32 which consists of 120 identical pre-amplifiers. The latter may be of the kind disclosed in the aforesaid copending application Serial Number 636,256. The unit 32 is further connected to a print driver and storage unit 34 which has 120 identical print drive amplifiers. Without so limiting the invention, the storage function of the unit 34 may be accomplished by a standard one-shot multivibrator connected to the output of each print driver and capable of storing one bit. A manual plugging unit 36, which is connected to the output of the unit 34, is capable of being selectively plugged to couple each of the 1120 print drivers to one of 160 print hammers of a hammer unit 38. The plugging unit may be of the type disclosed in a copending application by Richard M. Bloch, Alan J. Deerfield and Lynn W. Marsh, entitled Data Processing Apparatus, Serial Number 763,563, which is assigned to the assignee of the present application. The print hammers which make up the hammer unit may be of the kind disclosed in a copending application of Robert E. Wilkins et al., entitled "Mechanical Apparatus," filed November 17, 1960, Serial Number 69,853, which is assigned to the assignee of the present application. One hundred and twenty lines further couple the print driver and storage unit 34 to the input of the buffer 10.

A print roll 40 is positioned opposite a print hammer unit 38 so that the impact of the individual print hammers will provide an imprint on an intermediately positioned paper web 41. In the preferred embodiment of the invention, the print roll 40 has 56 different rows of data character type fonts spaced about its periphery, each row containing 160 identical characters. The hammer unit and the print roll may be of the type illustrated in a copending application by Robert E. Wilkins and Leonard E. Fowle entitled Mechanical Apparatus, Serial Number 69,853, assigned to the assignee of this application.

An index disc 42 is mechanically coupled to the print roll 40 to rotate in synchronism therewith. The index disc contains a single mark on its periphery which produces a single pulse per revolution in cooperation with a suitable pickup 44. The output of the latter is connected to the pattern generator 28 where it operates as an index pulse. A character disc 46 is mechanically coupled to the print roll 40 to rotate in synchronism with the latter and contains a mark for each row of data characters on the print roll. A pickup 48 which is stationed opposite the character disc and which is coupled to the input of the pattern generator 28 thus provides a character pulse for each row of data characters.

In the operation of the apparatus, a distinction must be made between the vertical format phase during which the paper web is positioned to obtain the desired line spacing, the loading phase during which information is loaded into the coincident current core memory 20 by way of the buffer 10, and the print and comparison phase. During the latter, the encoded data characters are compared against the character codes of the print roll character row next moving into printing position, printing occurs and a check is made to determine whether or not the print hammers have been impulsed in accordance with the data instructions provided. Suitable control signals ensure the appropriate operation of the apparatus for each different phase. Some of these phases of the operation overlap each other and certain operations take place concurrently as will be seen hereinafter.

It is important to bear in mind in the discussion which follows, that the different operations of the apparatus shown in the drawings occur under the control of timing pulses which, although they may be referenced to the master clock of the computer which serves as the data source for the apparatus, occur nevertheless as dictated by conditions peculiar to the apparatus itself. For example, it will be readily understood that while the computer itself may process data in accordance with the master clock pulses, printing cannot occur until the paper web has been moved to the line on which printing is to take place. The paper web positioning process, which is a mechanical process, is necessarily independent of the electronic master clock. Similarly, once the paper web has been positioned, the various data characters can be printed only in accordance with their appearance opposite the print hammers. This in turn depends upon the rate of rotation of the print roll 40 and is again independent of the computer master clock. Accordingly, the incoming data must be resynchronized prior to being fed into the buffer 10 fourteen bits at a time in accordance with the timing requirements of the apparatus.

The aforementioned timing pulses are produced by the primary timer 27 which may take the form of a counter which is capable of counting up to eight before being reset. Thus, eight basic periods are defined by the eight primary pulses PT1–PT8. Once the computer is ready to supply a data word and the apparatus described herein is ready to receive it, the loading phase of the operation is initiated upon the receipt of a suitable conditioning signal from the computer. The input data word is loaded into the memory registers MR1–MR14 as it is received from the computer and is temporarily stored there. Four primary timer pulses are employed to generate a four-pulse signal BF. The latter signal strobes the information in the unit 14 into the proper buffer locations in four transfers consisting of three groups of 14 binary digits each and one group of 12 binary digits. Thus, a word of 48 information bits and six parity check bits is read into the buffer. The signal BF serves not only to resynchronize the incoming information, but further performs an addressing function by feeding successive groups of binary data digits into predetermined buffer locations. Specifically, since the fourteen input lines are connected to 54 gate buffer amplifiers, the strobe signal BF properly gates the gate buffer amplifiers to accept data in accordance with a predetermined storage pattern. Thus, the data bits are rearranged into columns of six bits according to the data characters they represent, plus a parity check bit, if any. It will be noted that only a portion of the buffer is utilized during the loading phase of the operation.

Each of the 54 bits, once it is inserted into a gate buffer amplifier of the buffer 10, is allowed to recirculate on itself under the control of the buffer recirculation function BR. When needed, this data is read out of the buffer in primary synchronism under the control of the buffer selection signal BS which is capable of selecting one column of the buffer, i.e. eight buffer locations at a time. Owing to the manner in which the 54 buffer locations were filled, the BS signal will cause one six-bit character at a time and a parity check bit, if any, to be transferred out of the buffer. The buffer select signal is a function of an address selection function AS which sequentially addresses the core memory locations. Thus, when the first character in the buffer, i.e. the contents of locations 1–7 are transferred to BX1–BX7, the first memory location is addressed so that the character may be subsequently stored there.

The time required for transferring a single data character from the buffer 10 to the memory 20 is defined as a memory cycle and requires eight primary timer pulse periods to complete. Eight memory cycles are necessary to transfer the single word received during the loading phase of the operation from the buffer into the memory. For the present purpose, the required core memory capacity is 16 words, consisting of a total of 128 data characters. The 128 locations of the memory are addressed by the address selection function AS, which in turn is based on an address count from 0 to 127. The latter is itself controlled by the primary timer and is advanced by one count every eight pulse periods.

The individual bits are recirculated in the buffer exit unit 12 so that the data character is present at the output of the buffer exits BX1–BX7, sufficiently long, but less than one memory cycle, to permit the registers MR1–MR7 to be loaded under the control of the buffer exit control signal BXC. The contents of these registers are recirculated during the same memory cycle until their output is written into the memory by way of the inhibit drivers D1–D7, under the timing control of the write inhibit gate signal WIG. The specific address or location of the character in the core memory, which is the same for planes I to VII in this case, is determined by the previously mentioned address selection function AS.

A parity check of the data is made at all times when data is transferred out of the memory registers MR1–MR7. The parity check, which depends on the proper summing of the bits in a data word, ensures the veracity of the data coming from the memory register. In the event that an error occurs, the parity check output signal PCS may be used to actuate an alarm and/or to disable the apparatus.

The address selection technique which is used to read a character into or out of the memory forms no part of the invention herein and will not be described further. It is again pointed out that the address selection function AS is referenced to the primary timer so that successive memory locations are addressed at eight-pulse period intervals, i.e. once during each memory cycle.

The above-described operation is repeated on the succeeding address counts until the other seven characters which are still in the buffer have been read out. As previously explained, this occurs under the control of the BS signal which transfers the data in the respective gate buffer amplifiers directly to the buffer exits. When all eight characters have been transferred, there is no further address advance. The computer is notified through suitable circuitry beyond the scope of the apparatus herein described and another word is requested.

When sixteen data words have been read into the core memory, the loading phase of the operation is complete and a suitable signal, which may be derived from the 127th address count, will condition the apparatus for the subsequent phases of the operation. Data readout from the core memory is accomplished under the control of the address selection function AS and a readout signal STG which enables the sense amplifiers. During each memory cycle, one data character is transferred to the sense amplifiers SA1–SA7 whence it is fed back to the memory registers MR1–MR7. There it is recirculated and is available at the outputs. If it is to be preserved, it is transferred back into the core memory. It will be noted that parity checking takes place during each recirculation of the data about the core memory.

During the print and comparison phase, a number of operations are concurrently performed, i.e. they are carried out during the same memory cycle. It is important to note that during this phase the governing timing unit is the character pulse disc 46 which generates a separate pulse for each of the 56 different lines inscribed about its periphery. The particular phase of operation under consideration herein may therefore be divided into 56 distinct cycles during each of which the following operations occur:

(1) The pattern generator produces a six-bit code representative of a data character.

(2) The character code is compared against the data stored in the 120 separate locations of the core memory.

(3) A "one" bit is stored in the proper location of the buffer for each true comparison.

(4)The print pre-amplifier corresponding to the particular character under consideration is impulsed.

(5) The character impulse echo is checked to verify that a proper print impulsing has taken place.

As will become clear from the following description, in actual practice 58 cycles are required to carry out the print and comparison phase of the operation for all 56 characters, with the first two and the last two cycles encompassing only some but not all of the above-mentioned operations.

During the print and comparison phase the information which is contained in the words 2 to 16 is fed character by character from the output of the registers MR1–MR7 to the decoder comparators 24 and 26. There it is compared against the output of the pattern generator which provides a different character code in response to each of the 56 character pulses derived from the pickup 48 during a single rotation of the print roll 40. The timing is such that the output of the pattern generator for each data character remains active sufficiently long to permit a comparison with each of the 120 characters of information contained in the data words 2 to 16 which are stored in the memory. This timing relationship permits the use of a free-wheeling system wherein it is not necessary to await the return of the print roll to a predetermined starting point. The comparison operation may therefore be initiated at any time, regardless of which character row of the print roll is about to rotate into position for printing. The index pulses generated by the index disc 42 serve to reset the pattern generator to its initial position. Such reset is required at the beginning of the operation to predict the output of the pattern generator in response to the applied character pulses. It further serves to verify that the various parts of the apparatus operate in proper synchronism.

Each true comparison causes the comparator 24 to transfer a "one" bit to a particular location of the buffer which corresponds to the core memory location that is simultaneously being addressed. More specifically, a binary "one" bit which is indicative of a true comparison, is fed sequentially to all of the buffer entries BE1 to BE8 and is accepted by one of them under the control of a signal DEO which is a function of AS. Thus, the buffer row in which the bit is to be stored is determined. The proper buffer column is determined by the buffer select signal BS substantially in the same manner as described above in connection with the readout of the buffer. Since both of the signals DEO and BS depend on the address selection function AS which, at this time, addresses the corresponding location in the core memory, the "one" bit is fed to the proper location in the buffer.

This process continues until 120 comparisons have been carried out in the decoder comparator 24 and a "one" bit is stored in the proper location of the buffer for each true comparison of the character under consideration. It will be noted that, in contrast to the utilization of only a portion of the buffer during the loading phase of the operation, all 120 gate buffer amplifiers of the buffer are now employed. Since each of the 120 gate buffer amplifiers corresponds to one character location of the 120-character print line, each "one" bit now stored in the buffer indicates that the particular character which was compared is to be printed in the corresponding location of the print line. This is accomplished by simultaneously reading the data stored in the buffer out to the printer where the hammers will subsequently be actuated when the corresponding row of data characters on the print roll rotates into printing position. The operation is then repeated until 120 comparisons have been made for each of the 56 different characters inscribed on the print roll and the appropriate print-actuating signals for each character have been generated and sent to the printer. The printer impulse for each character is accompanied by an echo check, as hereinafter described, to verify that the proper print impulsing occurred. It will be understood that a line is thus printed during a single revolution of the print roll. This is true regardless of the character with which the comparison phase is initiated.

The vertical format phase of the operation is subsequently initiated by reading the memory locations 1–7 which contain the control word, out to the vertical format unit 25. The paper web is moved to the position on which the printing of the subsequent line is to take place. Concurrently with the vertical format phase, the loading phase for printing the subsequent line is carried out. The initiation of the print and comparison phase for the subsequent line must await the completion of both the loading and the vertical format phase.

As previously pointed out, a number of different operations occur concurrently during the print and comparison phase. These operations are detailed below and will become clear from a consideration of an actual example with reference to FIGURE 3 which illustrates five cycles of the print and comparison phase for a single line that is to be printed. The timing in each cycle is seen to be the same and corresponding subscript designations have been used in the drawing. Let it be supposed that the information stored in the memory calls for an "A" to be written into the first and last locations of the printed line, the latter being confined in this example to the first 120 of 160 total spaces. This means that the encoded character "A" is stored in the locations 8 and 128 in the core memory, the first seven locations being taken up by the control word which provides the vertical format data for the subsequent spacing of the paper web, but which is not printed.

The occurrence of the first character pulse at time $t_{AO}$ causes the pattern generator 28 to provide the code for the character "A" at its output substantially throughout the entire cycle. As the address selection function AS addresses the eighth memory location, a six-bit data character representative of an "A" is read out in the manner previously described to initiate a comparison at time $t_{A4}$. Upon the appearance of this character at the output of the registers MR1–MR7, the decoder comparator 24 registers a true comparison and sends a binary "one" to the buffer 10 in the manner outlined above. As previously discussed, the corresponding location 1 of this bit in the buffer is determined by the signals DEO and BS which are themselves functions of the address selection function. The address selection function continues to scan the core memory but no true comparisons are registered by the decoder comparator 24 for the "A" code derived from the pattern generator until the core memory location 127 is addressed. Here, the process described above is repeated and a "one" digit is written into the corresponding location 120 in the buffer. At time $t_{A7}$ all comparisons for the character "A" have been completed and no further true comparison results are sent to the buffer during this cycle.

During the first cycle, when the comparison of the character "A" in the unit 24 takes place, a similar operation for the same character occurs in the decoder comparator 26. The latter unit also compares the output of MR1–MR7 against the output of the pattern generator 28 between times $t_{A4}$ and $t_{A7}$. For each true comparison, a "one" bit is generated and is sent to the register MR8. The output signal of the latter is fed to the write inhibit driver D8, under the control of the write inhibit selection signal WIG. The output of the inhibit driver D8 in turn is applied to the core plane VIII, where it is stored at the proper address, as determined by the AS function which is then reading out the core memory. As in the case of the core memory planes I–VII, information storage in the core plane VIII occurs by recirculating the data, in this case via the path determined by the sense amplifier SA8, memory register MR8 and the write inhibit driver D8. For the example under consideration where the character "A" is to be printed in the first and last location of the print line, a "one" is stored in the locations 8 and 127 of the core plane VIII during the first cycle of the print and comparison phase.

The next character pulse which appears at time $t_{BO}$ initiates the next memory cycle and causes the pattern generator to provide the code for the character "B" at its output substantially throughout the entire cycle. Concurrently, the true comparison "ones" for the character "A" in the buffer, which were recirculating under the control of the buffer recirculation signal BR, are transferred to the pre-amplifiers 32 at time $t_{B1}$ under the control of a signal DGB. Since binary "zeros" were stored in the buffer locations 2 to 119, only the pre-amplifiers 1 and 120 are energized or print-impulsed.

The output signals of these pre-amplifiers are applied to the print driver amplifiers 1 and 120 of the unit 34. The inherent delay of these amplifiers is such that their outputs become active only at time $t_{B5}$. The outputs are connected to the plugging unit 36 which has been manually plugged for horizontal formating to determine in which of the 160 print line locations the respective 120 characters are to appear. If, as previously assumed, printing is to be confined to the first 120 spaces of the line, the print hammers 1 and 120 will be actuated. Due to the inertia of the mechanical parts the actual printing occurs considerably later in time. The timing is such, however, that the hammer impact with the print roll 40 occurs at the instant when the "A" character row of the print roll 40 rotates past the print station. When this occurs, an imprint of the character "A" is produced in the first and in the 120th position of the print line on the paper web.

From an examination of FIGURE 3 it will be seen that the print impulse for the character "A" is initiated at time $t_{B1}$, i.e. subsequent to time $t_{BO}$ when the next character pulse is generated which causes the pattern generator to produce the character "B" at its output. Thus, the pattern generator generates the code for the letter following the one that is being print-impulsed at any given time. As further seen from FIGURE 3, the print impulse for the character "A" occurs between $t_{B1}$ and $t_{B2}$ in the second cycle of the print and comparison phase and results in an output signal from the print drive and storage unit 34 which is initiated at time $t_{B5}$ of the second print cycle and which carries over to time $t_{C6}$ in the third cycle. The buffer is reset between $t_{B2}$ and $t_{B3}$ by terminating the buffer recirculation signal BR. This operation clears the buffer for the arrival of the subsequent data during the same cycle.

Between the times $t_{B4}$ and $t_{B7}$ of the second cycle, the contents of the core plane VIII relative to the character "A" are transferred to the core plane IX via the memory register MR9 and the write inhibit driver D9. "One" bits are thus read into the positions 8 and 127 of the core plane IX under the control of the address selection function AS. Data storage in the core plane IX occurs by recirculating the data in the manner described above.

Let it be assumed that the character "B" is stored in locations 9 and 126 of the core memory so as to call for printing a "B" in the second and in the 119th position of the print line. A true comparison will occur between times $t_{B4}$ and $t_{B7}$ of the second print cycle when the contents of the memory locations 9 and 126 are compared against the output of the pattern generator. "One" bits will thus be written into the positions 2 and 119 of the buffer in the manner described above. Concurrently, "ones" will be written into the positions 9 and 126 of the core plane VIII.

The arrival of the third character pulse at time $t_{CO}$ initiates the third print cycle of the print and comparison phase of the operation. As before, the character pulse advances the pattern generator so that the latter provides the character "C" in encoded form at its output. During this cycle, the buffer is read out under the control of DGB to provide a print impulse for the character "B" between times $t_{C1}$ and $t_{C2}$. Between $t_{C2}$ and $t_{C3}$ the buffer is reset.

The output signal of the print amplifier during the second print cycle which was used to energize the first and the 120th print hammers for the character "A," was additionally stored in the unit 34. The stored signals are referred to as the echos of the character "A" and consist of a single pulse in the first and the 120th location respectively. At time $t_{C3}$ these echos for the character "A" are simultaneously strobed into the buffer under the control of the signal PE. Once they are in the buffer, the gate buffer amplifiers are progressively read into the buffer units BX1–BX8 in groups of eight. This action occurs under the control of the signal BS substantially in the manner described above and clears the buffer progressively for the arrival, eight bits at a time, of the true comparisons for the character "C" in the period between $t_{C4}$ and $t_{C7}$. Concurrently, the outputs of BX1–BX8 are scanned by the AS function and the output signal is applied to the echo selection unit 50. If proper print impulsing occurred for the character "A," echo "ones" will be fed to the unit 50 at the beginning and at the termination of the buffer readout operation described. The echo check unit 29 compares the "echos" from the unit 50 with the true comparisons from MR9. This occurs between $t_{C4}$ and $t_{C7}$ and determines whether or not the character "A" was correctly print-impulsed. Any error indicated by the signal ECS may be used to operate an alarm and/or to disable the apparatus.

Let it be supposed that the character "C" is stored in the core memory location 10 which calls for a "C" to be printed in the third location of the print line. The comparison of the contents of the tenth memory location with the output of the pattern generator starting at time $t_{C4}$ will cause the decoder comparator 24 to transfer a "one" bit to the buffer which will be stored in the location 3 thereof. Concurrently, the contents of the core plane VIII relative to the character "B" comparison are transferred to the core plane IX. This transfer empties the core plane VIII to make room for the output of the decoder comparator 26 which reads a "one" bit into the location 10 in the core plane VIII.

Due to the storage capacity of the unit 34, its output remains active, for the character "A," until the time $t_{C6}$. Prior to this time, however, i.e., at time $t_{C5}$, the outputs of the second and the 119th print driver, become active for the character "B," in response to the print impulse applied between times $t_{C1}$ and $t_{C2}$. At time $t_{C7}$ the latter outputs are still active but the circuit is again ready for the next character pulse.

The process described above continues with each of the 56 different characters being compared during the cycle initiated by its character pulse and being print-impulsed in the subsequent cycle. Echo checking in each case occurs in the cycle following said subsequent cycle. It follows from the explanation above that during the first cycle of the print and comparison phase only a comparison of the character "A" takes place. During the second cycle, a comparison of the character "B" is effected and print-impulsing of the character "A" is carried out. During the third cycle all three operations occur, i.e., a comparison for character "C," print-impulsing for character "B" and an echo check for character "A" respectively. By the same token, the 56th cycle is the last cycle during which all three operations occur, for the 54th, 55th and 56th character respectively. During the 57th cycle, the 56th character is print-impulsed and the 55th character is echo-checked, but no comparison takes place. The 58th cycle is used solely to carry out the echo check of the 56th character. The signals for conditioning the apparatus to carry out some but not all of the above-described operations may be derived from a cycle counter actuated by the character pulses.

The pulses which initiate the 57th and 58th cycles are generated by the lines of the character disc 46 which, as explained above, has only 56 lines to match the number of different rows of characters on the print roll 40. Therefore, unless a complete print roll revolution is allowed to take place, printing on the next line will not start with the character "A." As previously pointed out, the free-wheeling operation of the apparatus permits the print and comparison phase to start with any one of the 56 different characters. Thus, it is not necessary to await the re-appearance of any particular character to initiate printing and a considerable time saving is effected.

The completion of the print and comparison phase of the system operation without error is indicated by a suitable signal from the cycle counter. The apparatus is again ready to position the paper web and to receive input data for the next line of print.

From the foregoing explanation it will be clear that the invention provides a vital checking function where the customary parity check, if any, is inadequate alone to verify that a particular character has been properly transferred to the location of the storage medium which is prescribed by the input data. By employing extensive time-sharing of existing equipment, the additional apparatus required to carry out this checking function is kept relatively simple. The operation, moreover, is such that the checking function performed by the invention does not substantially delay the transfer of the output data to the storage medium. As previously explained, the applicability of the invention herein disclosed is not limited to printers. It finds utility in connection with all data output equipment wherein the data codes are translated into actuating signals for the data transfer apparatus which effect the actual storage of the data characters in a data output storage medium.

From the foregoing disclosure of the invention, it will be apparent that numerous modifications, changes and equivalents will now occur to those skilled in the art, all of which fall within the true spirit and scope contemplated by the invention.

What is claimed is:

1. In combination with a printer of the type wherein print hammers are selectively energized to print chosen ones of a periodically recurring succession of different data characters on a medium located between said hammers and a support, data storage means, buffering means adapted to transfer incoming data to said storage means, means synchronized with said printer for periodically generating said succession of data characters, means adapted to compare the contents of said storage means with said successively generated characters and to transfer true comparisons to said buffering means and to said storage means respectively, means for energizing said hammers with said true comparisons in said buffering means to print corresponding data characters on said medium, means for returning the echos resulting from the energization of said hammers to said buffering means, and means for comparing the echos in said buffering means with the true comparisons in said storage means to verify the proper printing of said chosen data characters.

2. In combination with a printer of the type having print hammers selectively energized to print chosen ones of a periodically recurring succession of data characters on a medium located between said hammers and a support, means for storing incoming data, means synchronized with said printer for generating said succession of data characters, means for determining true comparisons between said successively generated characters and the contents of said storage means, means responsive to said true comparisons for energizing said hammers to print corresponding data characters on said medium, means for transferring said true comparisons to said storage means, and means for comparing the echos derived from the energization of said hammers with said true comparisons in said storage means to verify the proper printing of said chosen data characters on said medium.

3. In combination with a data output device of the type wherein transducers are selectively energized to cause chosen ones of a periodically recurring succession of data characters to be represented on an output data storage medium, means for storing incoming data, means synchronized with said output device for generating said succession of data characters, means for determining true comparisons between said successively generated characters and the contents of said storage means, means responsive to said true comparisons for energizing said transducers to cause the corresponding data characters to be represented on said medium, means for transferring said true comparisons to said storage means, and means for comparing the echos derived from the energization of said transducers with said true comparisons in said storage means to verify the proper representation of said chosen data characters on said medium.

4. Apparatus responsive to input data in a first code for controlling the storage of selected ones of a periodically recurring succession of different data characters in a storage medium, comprising a memory unit adapted to store data characters in said first code in a plurality of separate memory locations, said memory unit further including special storage facilities having corresponding memory locations, address selection means, a buffer unit having separate storage locations corresponding to those of said memory unit, said buffer unit being adapted to transfer the incoming encoded data to said memory unit under the control of said address selection means, a pattern generator for generating said different data characters in said first code in synchronism with said periodically recurring succession of data characters, a pair of decoder comparators each adapted to compare the output of said pattern generator with the contents of each of said memory locations, said comparators being further adapted to store a second code for each true comparison of the contents of a memory location in the corresponding locations of said buffer unit and of said special memory storage facilities respectively, means energized in response to the second codes in said buffer unit for storing corresponding data characters in said medium, means responsive to said last-recited energization for storing corresponding second code echoes in said buffer unit, and means for comparing said second code echoes in said buffer unit with said second code true comparisons in said special memory storage facilities to verify the proper storage of data characters in said medium.

5. Apparatus for verifying the transfer to a storage medium of data characters representative of input data composed of predetermined different data characters in digital code, a pattern generator for successively generating the codes of said different data characters, first and second comparators for concurrently determining true comparisons between each of said pattern generator codes and said input data, means energized in response to the true comparison indications derived from said first comparator for effecting the transfer of corresponding data characters to said storage medium, means responsive to said energization for deriving corresponding echo signals, and means for comparing said echo signals with the true comparison indications provided by said second comparator.

6. Apparatus for controlling the representation of selected ones of a recurring succession of data characters on an output data storage medium comprising means for storing incoming data, means in synchronism with said recurrence for generating said succession of data characters, means for determining true compairsons between said successively generated characters and the contents of storage means, means energized in accordance with said true comparisons to effect the representation of corresponding data characters on said medium, means for transferring said true comparisons to said storage means, and means for comparing the echoes resulting from said energization with the true comparisons in said storage means to verify the proper representation of said selected data characters on said medium.

7. Apparatus for controlling the selective storage of data characters in a data storage medium, comprising means for receiving incoming data, means for generating a predetermined succession of data characters, means for determining true comparisons between said succession of generated characters and the contents of said data receiving means, means energized in accordance with said true comparisons to store corresponding data characters in said medium means for storing said true comparisons in said data receiving means, and means for comparing the echoes resulting from said energization with the true comparisons stored in said data receiving means to verify the proper storage of data characters in said medium.

8. Apparatus for controlling the selective storage of data characters in a data storage medium, comprising means for receiving incoming data composed from a predetermined set of different data characters, means for successively determining true comparisons between said incoming data and independently generated ones of said predetermined set of different data characters, means energized in accordance with said true comparisons to store corresponding data characters in said medium, and means for comparing the echoes resulting from the energization of said last-recited means with said true comparisons to verify the proper storage of data characters in said medium.

9. Apparatus for verifying the transfer to a storage medium of data characters representative of input data composed of predetermined different data characters in digital code, a pattern generator for successively generating the codes of said different data characters, the occurrence of each of said generated codes defining a cycle of operation, first and second comparators for concurrently determining true comparisons between each of said generated codes and said input data, means energized in response to the true comparison indications derived from said first comparator during any given cycle for effecting the transfer of corresponding data characters to said storage medium during the subsequent cycle, means responsive to said energization for deriving corresponding echo signals, and means operative during the cycle following said subsequent cycle for comparing said echo signals with the true comparison indications provided by said second comparator.

10. In a control apparatus responsive to input data for transferring data characters to a data storage medium, a buffer including a plurality of storage locations, means for loading said data into said buffer locations arranged in encoded data character form, memory means adapted to receive said encoded data characters from said buffer, means responsive to the presence of said data characters in said memory means to store indications thereof in said buffer locations, means energized by said indications to transfer corresponding data characters to said storage medium, means responsive to said energization to store corresponding echoes in said buffer locations, and means for comparing said echoes with said indications derived from said first-recited responsive means to verify the proper transfer of data characters to said medium.

11. Apparatus responsive to input data in a first digital code for controlling the selective storage of data characters in a data storage medium, comprising a buffer having a plurality of locations each capable of storing a binary digit, means for resynchronizing said input data, means for loading said resynchronized data into said buffer locations arranged in data character form of a second digital code, a memory having a plurality of storage locations, means for transferring said data characters in said second code to respective ones of said memory locations, means responsive to the presence of each of said data characters in said memory to provide an indication thereof in a third digital code, means for storing said third code indications in said buffer locations in accordance with the locations of the corresponding data characters in said memory, means energized in accordance with said third code indications in said buffer to store corresponding data characters in said medium, means responsive to said energization to transfer corresponding echoes in said third code to said buffer, and means for checking said echoes against said third code indications derived from said first-recited responsive means to verify the proper storage of data characters in said medium.

12. Apparatus responsive to digitally encoded input data for controlling the storage of selected data characters of a periodically recurring succession of different characters in a storage medium, comprising a memory unit including first and second sections having a plurality of corresponding separate memory locations, address selection means, a buffer unit including a corresponding plurality of separate storage locations, said buffer unit being adapted to transfer the incoming encoded data to said first memory section under the control of said address selection means, a pattern generator for providing said succession of data characters in digital code in synchronism with said periodically recurring succession of characters, the occurrence of each of said pattern generator character codes defining a different cycle of operation of said apparatus, a pair of comparators for successively comparing each code provided by said pattern generator with the contents of each of said memory locations, said comparators being responsive to each true comparison to transfer a digitally encoded indication thereof to the corresponding locations of said buffer unit and of said second mamory portion respectively during the same cycle, means energized in response to the true comparison indications transferred to said buffer unit during any given cycle for storing corresponding data characters in said medium during the subsequent cycle, means responsive to the energization of said last-recited means for storing correspond digitally encoded echo signals in said buffer unit during the cycle following said subsequent cycle, said storage of echo signals in said buffer unit preceding the transfer to the latter of any true comparison indications of the concurrently compared data character, and means operative during said following cycle for comparing said echo signals with the true comparison indications stored in said second memory section relative to the same data character to verify the proper storage of said character in said medium.

13. Apparatus responsive to digitally encoded input data for controlling the storage of selected data characters of a periodically recurring succession of different characters in a storage medium, comprising a memory unit including first, second and third sections having a plurality of corresponding separate memory locations, address selection means, a buffer unit including a corresponding plurality of separate storage locations, said buffer unit being adapted to transfer the incoming encoded data to said first memory section under the control of said address selection means, a pattern generator for providing said succession of data characters in digital code in synchronism with said periodically recurring succession of characters, the occurrence of each of said pattern generator character codes defining a different cycle of operation, a pair of comparators for comparing each code provided by said pattern generator with the contents of each of said memory locations, said comparators being responsive to each true comparison to transfer a digitally encoded indication thereof to the corresponding locations of said buffer unit and of said second memory portion respectively during the same cycle, means energized in response to the true comparison indications transferred into said buffer unit during any given cycle for storing corresponding data characters in said medium during the subsequent cycle, means operative during said subsequent cycle for transferring said true comparison indications stored in said second memory section to said third memory section, means responsive to the energization of said storage medium for storing corresponding digitally encoded echo signals in said buffer unit during the cycle following said subsequent cycle, said storage of echo signals in said buffer unit preceding the transfer to the latter of any true comparison indications of the concurrently compared data character, and means operative during said following cycle for comparing said echo signals with the true comparison indications stored in said third memory section relative to the same data character to verify the proper storage of said character in said medium.

14. Apparatus responsive to encoded input data characters for controlling the printing of corresponding characters by a printer of the kind wherein selected print hammers are energized to effect imprints on a medium stationed between said hammers and the type fonts of a uniformly rotating print roll having a succession of type font rows spaced about its periphery and respectively representative of different data characters, comprising a pattern generator synchronized with the operation of said print roll and periodically adapted to provide a succession of electrical pulse codes at its output, each of said pulse codes corresponding to the coding of an input data character adapted upon its occurrence to define a separate operating cycle of said apparatus, a multi-plane coincident current core matrix comprising a plurality of memory locations each defined by corresponding cores in the different core planes, said core planes including first and second special purpose planes, means for sequentially addressing said memory locations, a buffer including a plurality of storage locations corresponding in number to said memory locations, means under the control of said addressing means and including said buffer for successively loading the encoded input data characters into different ones of said memory locations exclusive of said special purpose planes, means for parity-checking each character pulse code transferred from said buffer, first and second comparators operative during each of said operating cycles for independently comparing a single pattern generator character code with the input data stored in all of said memory locations sequentially selected by said addressing means during said cycle, each comparator being adapted to provide a single output pulse for each true comparison, means controlled by said addressing means during the same cycle for storing the true comparison pulses derived from said first and second comparators in the corresponding locations of said buffer and of said first special purpose core plane respectively, means responsive to said true comparison pulses stored in said buffer locations during each of said operating cycles for energizing corresponding ones of said print hammers during the subsequent cycle, means controlled by said addressing means during each of said subsequent operating cycles for transferring the contents of said first special purpose core plane to the corresponding locations of said second special purpose core plane, means operative during each of said subsequent cycles for deriving a single echo pulse in response to the activation of each of said energizing means, means controlled by said addressing means for transferring said echo pulses to said buffer during the cycle following each of said subsequent operating cycles, and means controlled by said addressing means during each of said following cycles for sequentially checking said echo pulses stored in said buffer against said true comparison pulses in said second special purpose core plane to verify the energization of the proper hammers.

15. Apparatus responsive to digitally encoded input data for controlling the printing of data characters by a printer of the kind wherein selected print hammers are energized to effect imprints on a medium stationed between said hammers and the type fonts of a uniformly rotating print roll having a succession of different rows of data characters spaced about its periphery, comprising a pattern generator synchronized with the operation of said print roll and adapted to provide a periodically recurring succession of electrical pulse codes at its output representative of a corresponding number of different data characters, the occurrence of each of said pulse codes being adapted to define a separate operating cycle of said apparatus, a multi-plane coincident current core matrix comprising a plurality of memory locations defined by corresponding cores of the different core planes, said core planes including first and second special purpose planes, means for sequentially addressing said memory locations, means for resynchronizing said encoded input data, a buffer including a plurality of storage locations respectively corresponding to said memory locations, means for loading said resynchronized input data into said buffer arranged according to said data character pulse codes, means controlled by said addressing means for successively loading said data character pulse codes stored in said buffer into corresponding locations of said matrix exclusive of said special purpose planes, means for checking the parity of each character pulse code being loaded into said matrix, first and second comparators for comparing each pattern generator character code with the character pulse codes stored in the sequentially addressed memory locations of said matrix, each comparator being adapted to provide a single pulse for a true comparison, means controlled by said addressing means during each operating cycle for storing said true comparison pulses derived during the same cycle from said first and second comparators in their corresponding locations in said buffer and in said first special purpose core plane respectively, means responsive to said true comparison pulses stored in said buffer locations during each of said operating cycles for energizing corresponding ones of said print hammers during the subsequent cycle, means operative during each of said subsequent cycles for transferring the contents of said first special purpose core plane to the second one of said planes, means for deriving a single echo pulse in response to the activation of each of said energizing means, means for storing said echo pulses derived in each of said subsequent cycles in said buffer during the cycle following, and means controlled by said address selection function during each of said following cycles for sequentially checking said echo pulses stored in said buffer against said true comparison pulses in said second special purpose core plane to verify the energization of the proper hammers.

16. In a printing machine connected to a data-processing machine and including a plurality of striking devices and a rotating type drum, a device for checking printing intended to verify that the printed characters are equivalent to the coded characters transmitted by the processing machine, comprising generator means for generating a checking pulse each time a striking device has been actuated, a character-code generator fast with said type drum, an equality comparing device comparing at each instant the coded characters transmitted by the processing machine with the character coded in the same code generated by the said code generator, switching means associated with said generator means and with said comparing device, so that it delivers an error signal when identity of the said coded characters is detected by said comparing device whereas no pulse is supplied by the said generator means, or when a pulse is supplied by the said pulse generating means whereas the comparing device does not detect identity of the said coded characters.

17. In a printing machine connected to a data-processing machine and including a plurality of striking devices and a rotating type drum, a device for checking printing intended to verify that the printed characters are equivalent to the coded characters transmitted by the processing machine, comprising generator means for generating a checking pulse each time a striking device has been actuated, a code generator fast with said type drum, an equality comparing device comparing at each instant the coded characters transmitted by the processing machine with the character coded in the same code generated by the said code generator and generating a comparing pulse when the said characters are identical, a coincidence circuit connected to said generator means and to said comparing device in order to be actuated at its inputs by the checking and comparing pulses and supplying an error signal at its output when only a single pulse is active at its inputs.

18. In a printing machine connected to a data-processing machine and including a plurality of striking devices and a rotating type-wheel, in which all the characters of one line transmitted in coded form from the processing machine are written to be stored in a character store, an arrangement for checking printing and designed to verify that the printed characters are equivalent to the coded characters stored in said store, comprising for each printing position a transducer device emitting a checking pulse each time an associated striking device has been actuated, a code generator fast with said typewheel, an equality comparing device comparing the coded characters extracted from the position of said store with the character coded in the same code generated by said code generator and emitting a comparing pulse when the said characters are identical, a coincidence circuit operatively connected to said transducers and said comparing device in order to be actuated at its inputs by the checking and comparing pulses and producing at one output a checking symbol each time the two pulses are present or producing at a second output the emission of an error signal when only a single pulse is active at its inputs.

19. In a high speed printing machine in which all the characters of a line to be printed are stored in a character store and including a rotating type drum, a plurality of striking devices and also a character-code generator operated in synchronism with said type drum, an arrangement for checking the effective printing of the characters repeatedly read-out from said store, comprising a transducer device emitting a checking pulse each time a striking device of a corresponding position has been actuated, a coded character emitted by said code generator, a code comparing device which compares the coded character emanating with the coded characters extracted from the store positions corresponding to that of the struck characters in the printed line, and which emits a comparing pulse when the said characters are identical, a coincidence circuit operatively connected to said transducers and to said comparing device to be actuated at its inputs by the checking and comparing pulses, and producing at one output a checking symbol when the two pulses are present, or producing at a second output an error signal when only a single pulse is active at its inputs.

20. In a high speed printing machine in which all the characters of a line to be printed are stored in a character store and including a rotating typewheel, a plurality of striking devices and a character-code generator operated in synchronism with said typewheel, an arrangement for checking the effective printing of the characters repeatedly read-out from said store, this arrangement comprising a series of transducer devices each associated with a device for striking a character and for supplying a pulse when the striking device of this position is actuated, a register of which each registering stage is connected to the output of a transducer for registering the pulse emitted by each transducer, a coded character emitted by the code generator, a synchronizing device which produces the successive reading-out of the characters from the character store, and in synchronism the sequential exploration of said register, a pulse comparator connected for constantly comparing the characters read-out from said store to said character-code, a coincidence circuit receiving at one input a comparing pulse emitted by the comparing device in the event of equality of the characters, and at a second input the reading pulse extracted from said register if a pulse has been registered in the corresponding position, so that the simultaneous application of a comparing pulse and of a reading pulse to the said coincidence circuit produces at one output of the said circuit the emission of a checking symbol, while the application of a comparing pulse in the absence of a reading pulse, or of a reading pulse in the absence of a comparing pulse produces the emission of an error signal at a second output of the said circuit.

References Cited by the Examiner

UNITED STATES PATENTS

| | | | |
|---|---|---|---|
| 2,897,480 | 7/1959 | Kumagai | 235—153 X |
| 2,978,678 | 4/1961 | Winger et al. | 235—153 X |

ROBERT C. BAILEY, *Primary Examiner.*

WALTER W. BURNS., Jr., MALCOLM A. MORRISON, *Examiners.*